Dec. 24, 1929.　　　W. B. BRONANDER　　　1,740,571
CIGAR FILLER FEED
Filed April 20, 1927　　　3 Sheets-Sheet 1

INVENTOR
Wilhelm B. Bronander
BY
Sydney J. Prescott
ATTORNEY

Dec. 24, 1929.    W. B. BRONANDER    1,740,571
CIGAR FILLER FEED
Filed April 20, 1927    3 Sheets-Sheet 2
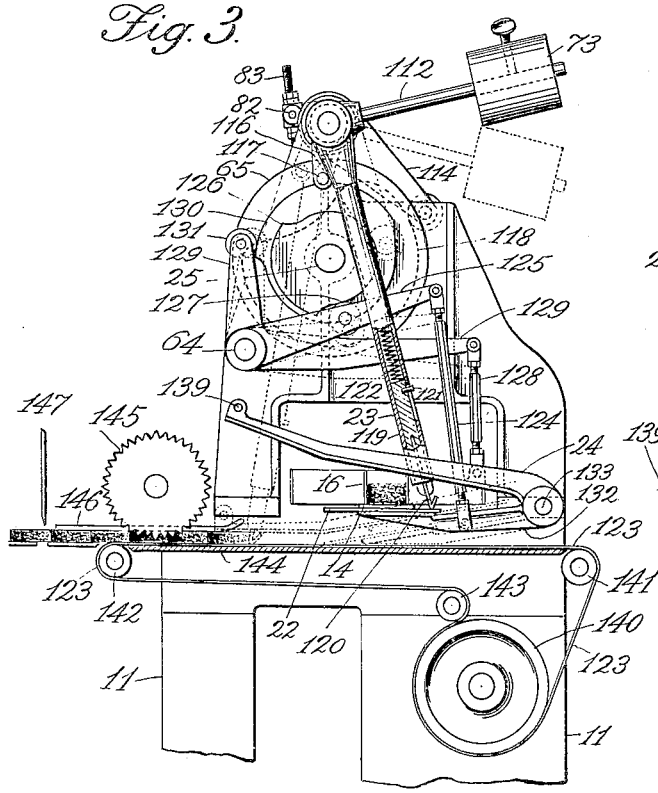
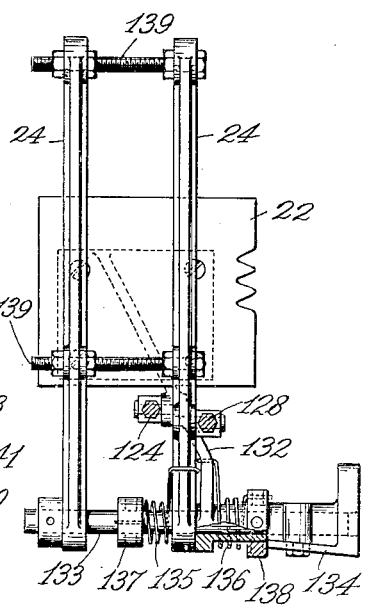
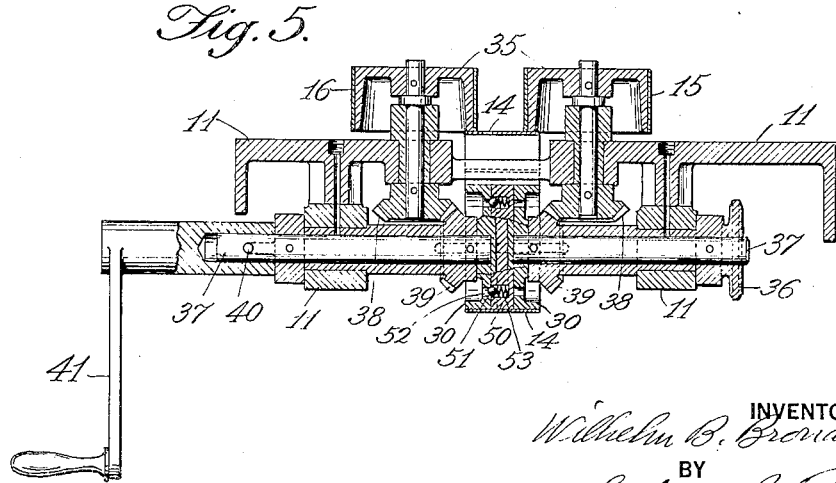

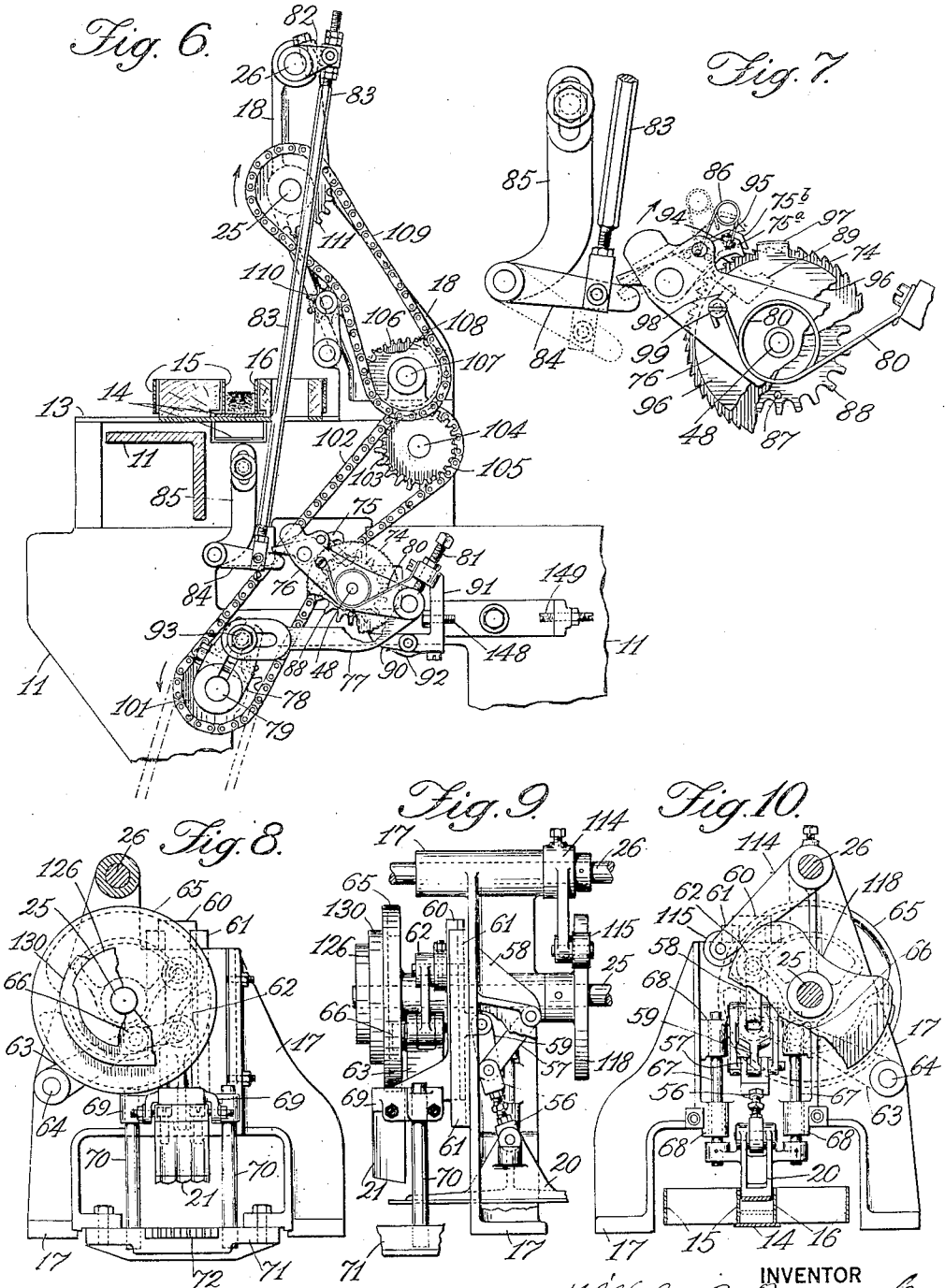

Patented Dec. 24, 1929

1,740,571

UNITED STATES PATENT OFFICE

WILHELM B. BRONANDER, OF MONTCLAIR, NEW JERSEY, ASSIGNOR TO INTERNATIONAL CIGAR MACHINERY COMPANY, A CORPORATION OF NEW JERSEY

CIGAR FILLER FEED

Application filed April 20, 1927. Serial No. 185,177.

This invention relates to an improved cigar filler feed.

The present invention involves a method of preparing filler for cigar bunches which consists in progressively arranging and forwarding filler stock lengthwise in a narrow stream, progressively compacting bunch-length sections of said filler in said stream and severing them therefrom, and progressively assembling said sections sidewise in a mass and compacting said mass to give it a proper density for separation into individual bunch charges. It further involves mechanism for carrying this method into effect and to prevent the production of shorts in so doing. With the objects indicated, and others not specifically mentioned, in view, the invention consists in certain methods, combinations and constructions which will be hereinafter fully described and then specifically set forth in the claims hereunto appended.

Figure 1:
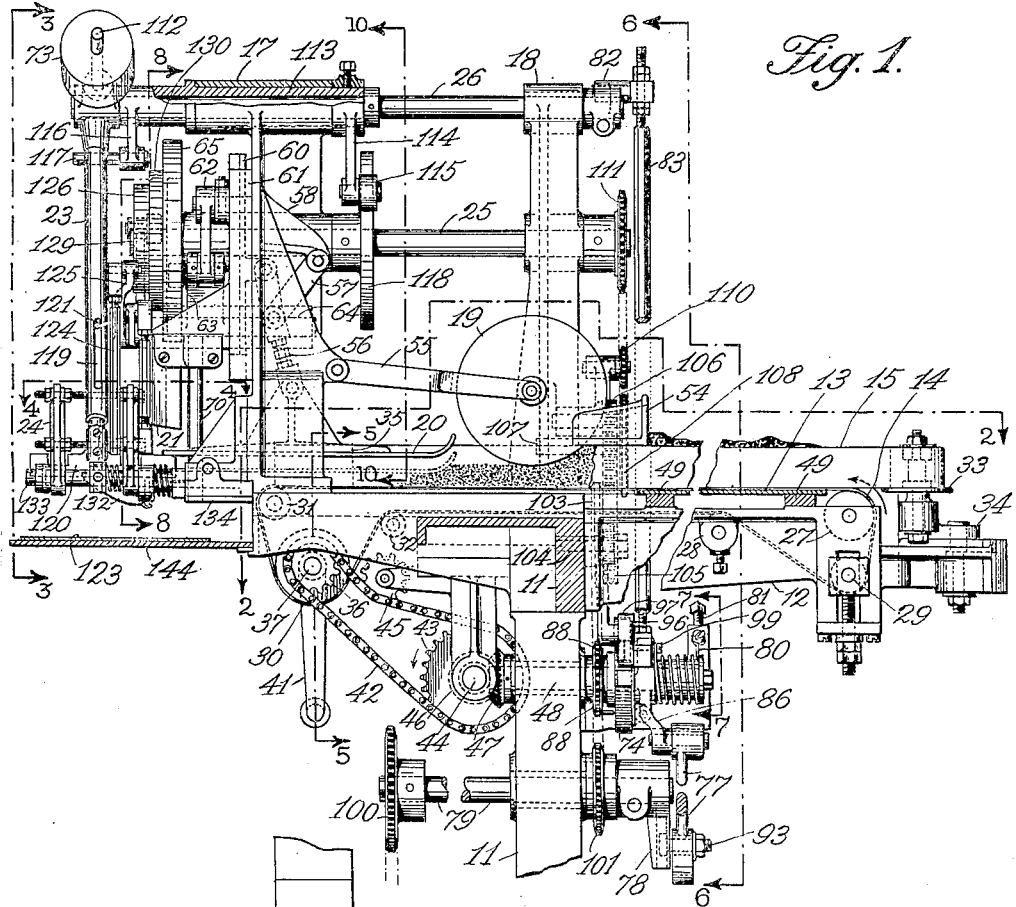
Figure 2:
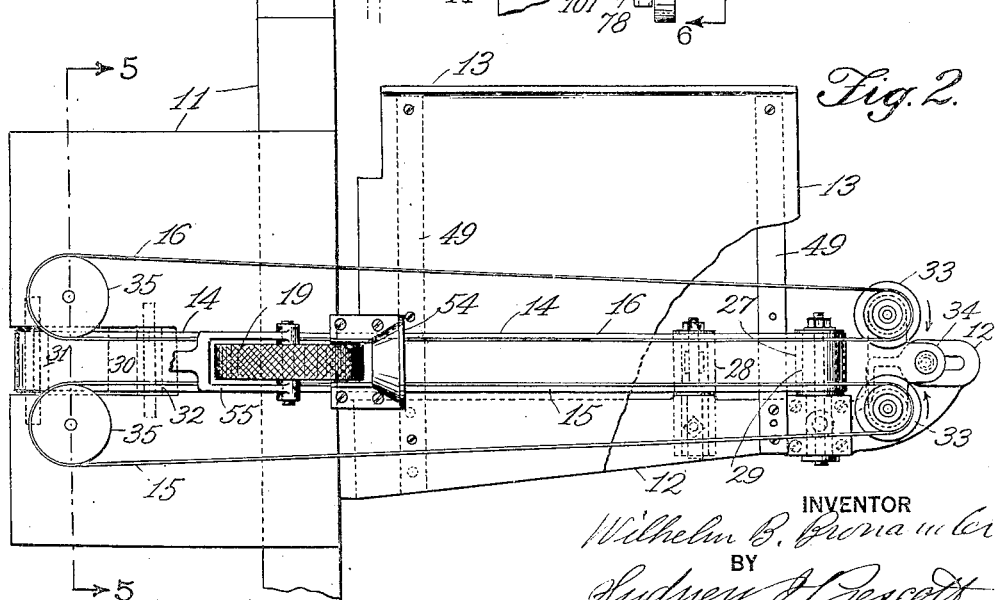

In the accompanying drawings, in which like characters of reference indicate the same or like parts, Fig. 1 is a side elevation of a cigar filler feed constructed in accordance with the invention; Fig. 2 is a plan view of the feed end showing the arrangement of the feed belts with the roller and chute, as seen from line 2—2 in Fig. 1; Fig. 3 is an end elevation taken on the line 3—3 in Fig. 1, showing the arrangement for transferring the cut bunch-length sections from the lengthwise feed to the sidewise feed; Fig. 4 is an enlarged plan view of the direction changing transfer platform and guide fingers, as seen from line 4—4 in Fig. 1; Fig. 5 is an enlarged cross-section of the lengthwise feed on the line 5—5 of Fig. 1, showing the drive for the lengthwise feed belts; Fig. 6 is an end elevation showing the driving mechanism of the transfer arrangement, as viewed from the line 6—6 in Fig. 1; Fig. 7 is an enlarged detail view of a portion of the feed control, as seen from the line 7—7 in Fig. 1; Fig. 8 is an end elevation of the corrugated bunch-length severing means, as viewed from the line 8—8 in Fig. 1; Fig. 9 is a side elevation of the compressor and bunch-length severing means, showing their common drive; and Fig. 10 is an end elevation of the compressor, as seen from line 10—10 in Fig. 1.

In carrying the invention into effect, there is provided a feeder for forwarding section filler lengthwise in a narrow stream, means for compacting bunch-length sections of filler in said stream and severing them therefrom, and mechanism for progressively assembling and compacting and advancing said sections sidewise in a mass of the proper density for separation into individual bunch charges. In the best constructions contemplated, said feeder includes actuating means and a filler supporting belt intermittently operating in accordance with the density of said mass; said means includes actuating means and a device for successively compacting bunch-length sections of filler in said stream to prevent displacement of their component parts as they move away from said feeder; said mechanism includes means for supporting said mass at a lower level than said feeder, and means for transferring sections of filler from the level of said feeder to that of said mechanism; said mechanism is operative at right angles to the direction of movement of said stream and includes a support receiving filler sections from said feeder, and a coacting rake swinging back and forth over said support for transferring said sections from said support to said mass; said mechanism further includes means for moving back and forth behind said mass to successively assemble filler sections with said mass and to compact said mass. All of the above mentioned parts may be widely varied in construction within the scope of the claims, for the specific device selected to illustrate the invention is but one of many possible concrete embodiments of the same. The invention therefore is not to be restricted to the precise details of the structure shown and described.

Referring to Figs. 1 and 2, the filler feed is mounted on the frame 11 of a cigar machine in connection with which it is used. A long bracket 12 is attached to the side of the frame 11 and supports the feed table 13 and one end of the feed belts 14, 15 and 16, the frame 11 supporting the other ends of these feed belts.

The frame 11 also supports the sidewise feed and part of the drive and control mechanism. Pedestals 17 and 18 are mounted on the top of the frame 11 and support the compressing wheel 19, the compactor 20, the corrugated cutter 21, the transfer platform 22, the transfer arm 23, the transfer guides 24, the cam shaft 25, and the fulcrum 26.

The filler tobacco is progressively placed in the channel formed by the horizontal feed belt 14 and the two vertical feed belts 15 and 16, this channel forming the lengthwise feed. The horizontal belt 14 is supported by the pulleys 27 and 28 and by the adjustable pulley 29 near the outer end of the bracket 12, and by the pulleys 30, 31 and 32 mounted on the main frame 11. The forward belts 15 and 16 are supported by the flanged pulleys 33 carried on an adjustable slide 34, mounted on the end of the bracket 12, and by the pulleys 35 mounted on the frame 11. Fig. 5 shows a section of the lengthwise feed taken on the line 5—5 in Fig. 1. The horizontal belt is driven by a sprocket 36 on a shaft 37, and the vertical belts 15 and 16 are driven by bevel gears 38 which mesh with gears 39 on the shaft 37. The shaft 37 is provided with a pin 40 so that it may be turned by a handle 41 when adjusting the machine. The sprocket 36 on the shaft 37 is driven by a chain 42 from a sprocket 43 on a shaft 44, the chain running over an idler 45. The shaft 44, in turn, has a bevel gear 46 in mesh with the bevel gear 47 on the shaft 48.

The bracket 12 carries cross-bars 49, upon which the feed table 13 rests, and it also serves as a support for the horizontal feed belt 14. In order to facilitate the replacement of the horizontal belt 14, the shaft 37 is made in two parts, and the drive pulley 30 is provided with a removable center portion 50 which forms the coupling for the adjacent ends of the shaft 37 which, as well as the permanently mounted pulley ends 30, are recessed to receive corresponding projections of the coupling disk 50. The latter is held in place by the balls 51, and the springs 53 are driven inward sufficiently to hold the balls in place when the disk is removed.

On its forward motion, the stream of filler is guided by the chute 52 in order to pass all of it under the compacting roller 19, suspended by the pivoted arm 55 from the pedestal 17.

As hereinbefore indicated, the narrow stream of filler advanced by the belts 14, 15 and 16 is cut into individual bunch-length sections beyond the delivery ends of the belts, and in order to prevent displacement of the component parts of the bunch-length sections as they are moved away from the feed belts, after being severed therefrom, and by the advancing stream, there is provided means for compacting the bunch-length sections and severing them from the advancing stream. As shown, this means includes the compactor 20 (Figs. 9 and 10) which comes down on the leading end of the advancing stream during an interval when the feed belts are stopped and the compacting action effected by the compactor 20 gives the bunch-length section sufficient strength to prevent displacement of its component parts in the next operation. The compactor 20 is suspended by links 56 and 57, from a bracket 58 of the pedestal 16, the joint of the aforesaid links being connected by the link 59 with the slide 60. The lower link 56 is in the form of a turnbuckle to enable adjustment of the compactor to control the density of the filler charge. The slide 60 is mounted between the vertical guide rails 61 on the pedestal 17, and is moved up and down by a link 62 attached to a lever 63 fulcrumed on the shaft 64 and controlled by a cam 65 on the shaft 25 through the roller 66. The compactor is guided in its reciprocating movement by the rods 67 which slide in bearings 68 forming parts of the pedestal frame.

The arm 63 and slide 60 also operate the sinuous or corrugated cutter 21 (Figs. 8 and 9) which is mounted in a frame 69, attached to the slide 60, and slide up and down on guide posts 70, supported by a base 71 attached to lugs on the pedestal frame 17. The base 71 also carries the ledger plate 72 for the cutter 21.

The platform 22, upon which the leading end of the filler stream rests while the leading bunch section is being severed from the stream and the following bunch section is being compacted, together with the swinging arm 23 actuated by a weight 73, transfers the severed bunch-length section to the sidewise feed which is at a lower level than the lengthwise or stream feed. The weight 73 is adjustable to govern the density of the filler mass of assembled bunch sections, each section being pushed forward by the transfer arm or rake 23 against the bunch sections previously assembled on the sidewise feed until the density of the accumulated mass equals the weight. At the end of its stroke, the transfer arm 23 starts the lengthwise feed, as will be described hereinafter, so that if at any time the already sufficient density of the section mass does not permit the weight 73 to carry the new section to the end of the transfer stroke, the lengthwise feed will not operate during the next cycle of the machine, and no new section will come in until the sidewise feed is advanced a step during that cycle, thereby making room for new sections to be added without unduly increasing the density of the mass.

As shown in Figs. 6 and 7, the lengthwise feed is intermittently driven by a ratchet 74 mounted on the shaft 48 so long as a pawl 75 pivoted in one end of a lever 76 is in engagement with it. The lever 76 is rotatably mounted on the shaft 48 and is rocked back and forth by a rod 77 connected to a crank 78 on a shaft 79. The lever 76 is held in tension by means of a spring 80 which pulls it against a stop screw 81 when the pawl 75 is out of engagement with the ratchet 74. The fulcrum shaft 26 of the transfer arm 23 carries an arm 82 which is connected by a rod 83 with the lever 84 pivoted on an adjustable bracket 85, the free end of the lever 84 engaging the pawl 75 in its raised position when the lever 76 is in its neutral position against the stop 81, thereby tripping the pawl 75 into engagement with the ratchet 74 and setting the lengthwise feed in motion. The tooth end of the pawl 75 is attached to the lever 76 by a double acting spring 86 which holds it in engagement with the ratchet 74 until released by the pin 87, carried on the loose sprocket 88, striking the finger 89 attached to the pawl 75. The same spring then holds the pawl out of engagement until it is again acted upon by the lever 84. The rod 77, at its joint with the crank 78, is provided with a slot which permits the spring 80 to pull the arm 76 against the stop 81 when the pawl is released. To prevent backward movement of the ratchet 74 during this engagement with the pawl 75, a backlash pawl 90 is pivoted in the bracket 91 and is actuated by a spring 92.

The crank 78 is provided with a slot for the reception of a crank pin 93, so that its stroke may be adjusted to time the duration of engagement of the ratchet 74 and thus vary the length of the successive forward movements of the belts 14, 15 and 16 to correspond with the various lengths of cigars that may be made by the machine. The supporting arm 85 and the rod 83 are made adjustable so that the position of the lever 84 can be adjusted to suit the various settings of the crank pin 93.

The pawl 75 is made in two sections, 75$^a$ and 75$^b$, Fig. 7, each of substantially one-half the width of the ratchet 74 and connected by a pin 94 attached to one section and engaging a hole 95 in the other section, this hole being sufficiently larger than the pin 94 so that there is a radial displacement of the two sections equal to the depth of the ratchet teeth. One of these sections is made one-half of a tooth pitch longer than the other, so that as the pawl tooth nearest in mesh will engage the ratchet, greater accuracy in measuring off the length of the charge is attained by this means.

To prevent the pawl 75 from coming into engagement accidentally, as by vibration of the machine in case the transfer arm 23 is only moved just far enough to leave the spring 86 on dead center, and thus starting the feed before the next charge is ready, a safety device is employed. On the shaft 48 adjacent the inside face of the ratchet 74 is loosely mounted a thin disk 96 (Figs. 1 and 7) having a lateral projection 97 extending across the face of the ratchet 74 close to its teeth. The disk 96 has a short arcuate slot 98 through which passes a screw 99, by means of which the spring 80 is attached to the arm 76, and which thus permits a limited amount of relative movement between the disk and the arm. As the arm 76 with the partly raised pawl moves forward in the next cycle, the tooth end of the pawl passes over the projection 97, relative motion between the pawl 75 and the disk 96 taking place until the screw 99 has engaged the end of the slot 98, in which position the pawl is directly over the projection 97, so that accidental tripping of the same will cause it to land on top of the projection and thus prevent its engagement with the ratchet. In normal operation, when the arm 23 travels to the end of its stroke, the lever 84 trips the pawl 75 before its forward tooth has passed the rear edge of the projection 97, so that the pawl—after engagement with the ratchet—will engage the projection 97 and carry it along.

The crank shaft 79, which is driven by a sprocket 100 (Fig. 1) from the main drive of the cigar machine in connection with which the feed is used, has a sprocket 101 (Figs. 1 and 6) connected by a chain 102 with a sprocket 103 on a stud 104, the chain 102 also passing over the idler sprocket 88 on the shaft 48. On the stud 104 is mounted a gear 105 which meshes with the gear 106 on a stud 107, thereby driving a sprocket 108 which, by means of a chain 109 running over the idler sprocket 110, drives the sprocket 111 on the cam shaft 25.

The fulcrum shaft 26, to one end of which is attached the transfer arm 23 and a rod 112 carrying the adjustable weight 73, and on the other end of which is mounted the arm 82 actuating the cutting rod 83,—has a sleeve 113 (Fig. 1) to which is fastened a lever 114 carrying a cam roller 115, while an arm 116 extending from said sleeve carries a pin 117 engaging the transfer arm 23. The cam roller 115 is in engagement with a cam 118 on the shaft 25, thereby, through the aforesaid pin 117, lifting the transfer arm 23 into its highest position in every cycle of the machine. The pin 117 then recedes and leaves the arm 23 free to descend by the action of the weight 73, the amplitude of its forward movement depending upon the density of the filler mass, as hereinbefore described.

The transfer arm 23 (Figs. 1 and 3) is tubular and is provided with a plunger 119 to which is attached the rake 120, the plunger 119 being provided with a pin 121 sliding in a slot of the arm 23 to prevent its turning. A spring 122 in the upper part of the arm 23 keeps the rake in contact with the transfer platform 22. The latter is held in a horizontal position as the narrow stream of filler is advanced upon it. It is then swung to the lower level of the sidewise feed belt 123 by a rod 124 attached to a cam lever 125 fulcrumed on the shaft 64, and controlled by a cam 126 on the shaft 25 and a cam roller 127. The platform 22, being cut out to match the corrugations of the cigar severing cutter 21, also serves as a die or ledger plate for the cutter.

While each section is being transferred from the lengthwise to the sidewise feed, it is held in place on the platform 22 by the fingers 24 controlled by the rod 128 attached to a bell crank lever 129 fulcrumed on the shaft 64 and actuated by a cam 130 on the shaft 25 and cam roller 131. The fingers 24, and the bracket 132 carrying the platform 22, are fulcrumed on a shaft 133 supported in bearings 134 carried by the pedestal 17. They are loosely mounted on this shaft and are held in tension by springs 135 and 136 (Fig. 4). The spring 135 presses the fingers 24 down, while the spring 136 pushes the platform 22 up. The collars 137 and 138, to which these springs are anchored, are provided with radial holes to facilitate their operation for adjustment of the springs. The outer finger 24 is attached to the inner finger by means of screw studs 139 having adjustable nuts, thereby providing adjustment of their distance to conform with cigars of different lengths.

The sidewise feed belt 123, which is driven by a pulley 140 from the main drive of the cigar machine, and which is guided by the pulleys 141, 142 and 143, and whose working portion is supported by a plate 144 extending between pulleys 141 and 142, carries the section assembly or mass of filler from the transfer platform 22 to the star wheels 145, the charges being guided by the fingers 24 to pass under the grid 146. Emerging from the latter, the filler is cut into bunch charges by the cutter 147, whereupon a charge transfer device operated by the cigar machine drive (and not shown but well understood) and moving back and forth between the stop screws 148 and 149 (Fig. 6), delivers each bunch charge to the rolling table on which the binder is applied to produce a cigar bunch.

In view of the foregoing, a detailed description of the operation of the device is deemed unnecessary and is therefore omitted in the interest of brevity.

What is claimed is:

1. The combination with means for forwarding cigar filler lengthwise in a narrow stream, of means for severing sections from said filler, means for assembling severed sections sidewise in a mass for separation into bunch charges, and means for causing the action of said assembling means to control the operation of said forwarding means.

2. The combination with means for forwarding cigar filler lengthwise in a narrow stream, of means for severing sections from said filler, means for assembling severed sections sidewise in a mass for separation into bunch charges, and connections between said assembling means and said forwarding means operating to permit said forwarding means to operate only when said mass is below maximum.

3. The combination with intermittently operating means for forwarding cigar filler lengthwise and horizontally in a narrow stream, of vertically reciprocating means operative while said forwarding means is stationary for temporarily compacting bunch-length sections of forwarded filler to prevent displacement of their component parts as they are pushed ahead by said forwarding means, means for severing said sections from said filler, and means for assembling severed sections sidewise in a mass of bunch-length width for separation into bunch charges.

4. The combination with intermittently operating means for forwarding cigar filler lengthwise and horizontally in a narrow stream, of vertically reciprocating means operative while said forwarding means is stationary for temporarily compacting bunch-length sections of forwarded filler to prevent displacement of their component parts as they are pushed ahead by said forwarding means, and means for severing said sections from said filler.

5. The combination with intermittently operating means for forwarding cigar filler lengthwise and horizontally in a narrow stream, of vertically reciprocating means operative while said forwarding means is stationary for temporarily compacting bunch-length sections of forwarded filler to prevent displacement of their component parts as they are pushed ahead by said forwarding means.

6. The combination with vertically reciprocating means for temporarily compacting bunch-length sections of cigar filler to prevent displacement of their component parts when pushed ahead, of means for severing said sections from said filler, and means for assembling severed sections sidewise in a mass of bunch-length width for separation into bunch charges.

7. The combination with vertically reciprocating means for temporarily compacting bunch-length sections of cigar filler to prevent displacement of their component parts when pushed ahead, of means for severing said sections from said filler.

8. Means for temporarily compacting bunch-length sections of cigar filler to prevent displacement of their component parts when pushed ahead, comprising a filler support, a bunch-length presser foot, and means for reciprocating said foot toward and away from said support.

9. Means for temporarily compacting bunch-length sections of cigar filler to prevent displacement of their component parts when pushed ahead, comprising a filler support, a bunch-length presser foot, guides controlling reciprocation of said foot toward and away from said support, and means for actuating said foot.

10. Means for temporarily compacting bunch-length sections of cigar filler to prevent displacement of their component parts when pushed ahead, comprising a filler support, a bunch-length presser foot, guide rods carried by said foot, stationary bearings for said rods arranged to cause said foot to reciprocate toward and away from said support, and means for actuating said foot.

11. Means for temporarily compacting bunch-length sections of cigar filler to prevent displacement of their components parts when pushed ahead, comprising a filler support, a bunch-length presser foot, and toggle mechanism for reciprocating said foot toward and away from said support.

12. Means for temporarily compacting bunch-length sections of cigar filler to prevent displacement of their component parts when pushed ahead, comprising a filler support, a bunch-length presser foot, guide rods carried by said foot, stationary bearings for said rods arranged to cause said foot to reciprocate toward and away from said support, and cam-actuated toggle mechanism for actuating said foot.

13. Means for severing bunch-length sections from a narrow stream of cigar filler, comprising a filler support, a knife, a crosshead carrying said knife, a slideway and stationary posts spaced therefrom for confining movement of said knife to reciprocations toward and away from said support, and means for moving said crosshead along said guiding means.

14. Means for severing bunch-length sections from a narrow stream of cigar filler, comprising a filler support, a knife, a crosshead carrying said knife, a slideway and stationary posts spaced therefrom for confining movement of said crosshead to reciprocations toward and away from said support, and cam-actuated linkage actuating said crosshead.

15. Means for assembling bunch-length sections of cigar filler sidewise in a mass of bunch-length width for separation into bunch charges, comprising a support receiving said sections at one level, means for supporting the mass at a lower level, means for tilting said support to provide a pathway from the higher level to the lower level, and means for raking filler from the tilted support to the mass.

16. Means for assembling bunch-length sections of cigar filler sidewise in a mass of bunch-length width for separation into bunch charges, comprising a hinged support receiving said sections at one level, means for supporting the mass at a lower level, means for swinging said support downwardly on its hinge to provide a pathway from the higher level to the lower level, and means for raking filler from the support to the mass.

17. Means for assembling sections of cigar filler sidewise in a mass for separation into bunch charges, comprising a support receiving filler at one level, means for supporting the mass at a lower level, means for tilting said support to provide a pathway from the higher level to the lower level, and a rake operative only when the mass is below maximum for raking filler along said pathway to the mass.

18. Means for controlling the action of a primary cigar filler feeding mechanism by the action of a secondary filler feeding mechanism, comprising means for operating said primary feeding mechanism, means for assembling filler in said secondary feeding mechanism, and a trip mechanism controlled by the action of said secondary feeding mechanism and controlling the action of said primary feeding mechanism.

19. Means for controlling the action of a primary cigar filler feeding mechanism by the action of a secondary filler feeding mechanism, comprising ratchet mechanism for operating said primary feeding mechanism, a yieldable rake for assembling filler in said secondary feeding mechanism, and linkage connecting said ratchet mechanism and said rake to cause said rake to control the operation of said ratchet mechanism.

In testimony whereof, I have signed my name to this specification.

WILHELM B. BRONANDER.